Oct. 21, 1952     E. E. EATON     2,614,671
SYNCHRONIZER CLUTCH ELEMENT
Filed Sept. 12, 1947     2 SHEETS—SHEET 1
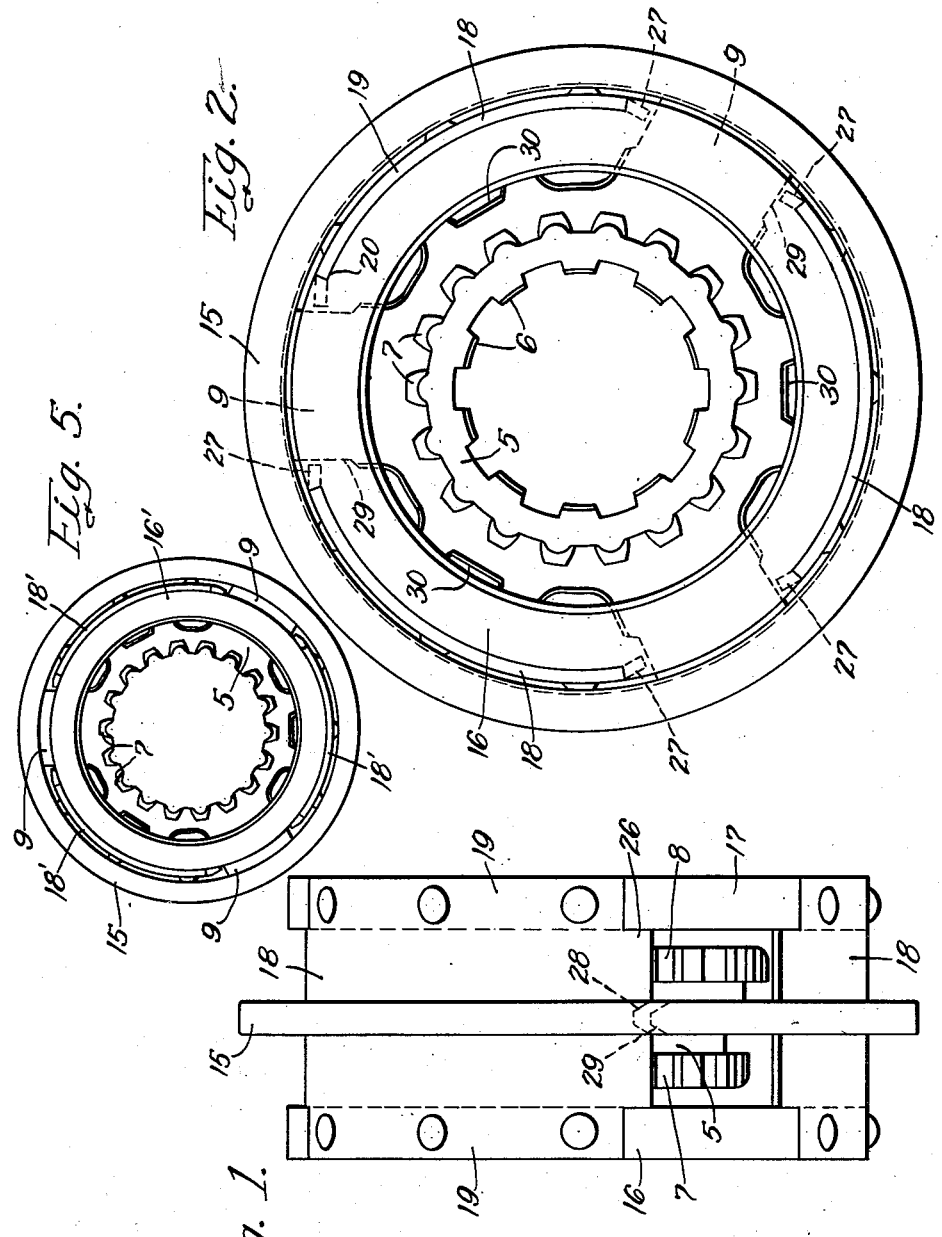
Inventor:
Ernest E. Eaton,
By Walter E. Schirmer
Atty.

Oct. 21, 1952 — E. E. EATON — 2,614,671
SYNCHRONIZER CLUTCH ELEMENT
Filed Sept. 12, 1947
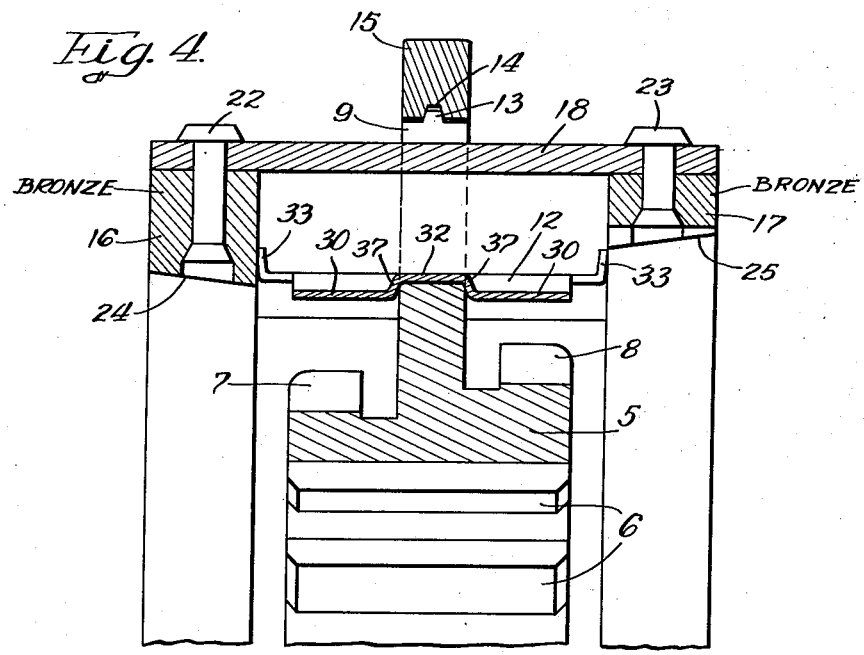
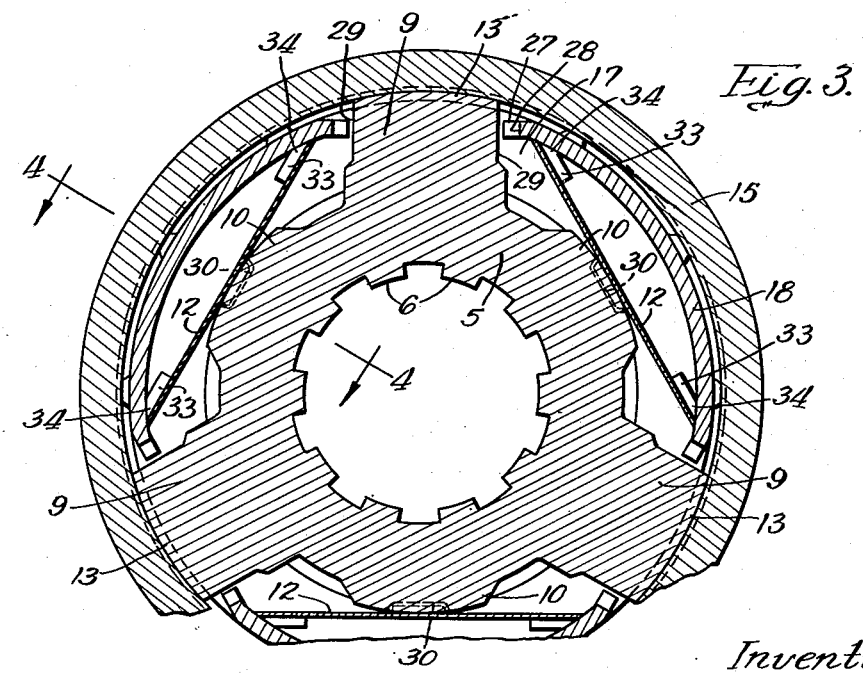
Inventor:
Ernest E. Eaton,
By Walter E. Schirmer
Att'y.

Patented Oct. 21, 1952

2,614,671

UNITED STATES PATENT OFFICE 2,614,671

SYNCHRONIZER CLUTCH ELEMENT

Ernest E. Eaton, Buchanan, Mich., assignor to Clark Equipment Company, Buchanan, Mich., a corporation of Michigan Application September 12, 1947, Serial No. 773,709

2 Claims. (Cl. 192—107)

This invention relates to synchronizers and more particularly is directed to a synchronizer construction for use between adjacent gear trains in a change speed transmission or the like, for facilitating shifting from one gear train to the other.

Broadly, the present invention is directed primarily to synchronizers for use in truck, bus and other vehicle type transmissions, although its use is not limited in any respect to these types of vehicles.

One of the primary objects of the present invention is to provide a simplified synchronizer construction in which a number of extensive machining operations in the fabrication of the various parts has been eliminated.

Another object of the present invention is to eliminate certain broaching operations previously required and to substitute the use of metal stampings in certain portions of the synchronizer structure.

Still another object of the present invention is a novel method of assembling the yoke collar to the clutch hub and a novel method of attaching the synchronizer cones or rings to the synchronizer sleeve.

The present synchronizer provides positive blocking action and is of economical design, capable of mass production at relatively low cost.

Other objects and advantages of the present invention will appear more fully from the following detailed description, which, taken in conjunction with the accompanying drawings, will disclose to those skilled in the art the particular construction and operation of a preferred form of the present invention.

In the drawings:

Figure 1 is an elevational view of a synchronizer constructed in accordance with the present invention.

Figure 2 is a side elevational view of the synchronizer shown in Figure 1.

Figure 3 is a sectional view through the synchronizer construction.

Figure 4 is a sectional view taken substantially on line 4—4 of Figure 3; and

Figure 5 is a side elevational view of a slightly modified form of construction.

Referring now in detail to the drawings, the synchronizer comprises essentially a clutch hub portion indicated generally at 5, having internal splines 6, by which the hub is mounted for conjoint rotation with the shaft of a transmission or the like. The clutch hub 5 is provided at opposite ends thereof, with external chamfered clutch teeth 7 and 8, adapted, when the hub is shifted axially along the splined shaft, to move into meshing engagement with corresponding clutch teeth carried by the adjacent gears. The clutch hub member 5 is also provided with radially extending arm portions, indicated generally at 9, which arm portions are disposed in circumferentially spaced relation to each other and preferably may be three in number. Each of the arm portions 9 is separated from the adjacent arm portion by an intermediate portion 10 of the clutch hub, which portion 10 is provided with a machined seating surface adapted to receive spring members 12, which will be described in more detail later.

The terminal ends of the arm portions 9 are provided with circumferentially extending wedge shaped lip portions 13, as indicated in Figures 3 and 4, which wedge shaped lip portions are adapted to interlock with a corresponding annular wedge shaped channel 14, formed in the annular yoke collar or ring member 15.

The synchronizer also includes two synchronizer rings, indicated generally at 16 and 17 in Figures 1 and 4, these rings being of an internal diameter circumferentially greater than the diameter of the clutch tooth elements 7 and 8, and arranged to be held in spaced relation by means of a plurality of arcuate metal stampings 18, these stampings having peripheral portions or edges 19 which are recessed, as clearly shown in Figure 2, into corresponding notched out portions 20 of the synchronizer rings. Preferably, three such stampings 18 are provided, these stampings being riveted as by means of rivets 22 and 23, respectively, to the synchronizer rings 16 and 17, to fix the rings in definite axially spaced relationship, and being recessed into the annular surface of the rings are adapted also to transmit torque from said rings to the spacer members independently of the rivets. It will be noted that the synchronizer ring 16 is provided with an outwardly tapered internal surface 24, adapted to frictionally engage a corresponding surface on the gear located adjacent thereto for bringing this gear into synchronous speed with the ring 16 during the clutching operation.

Similarly, the ring 17 is provided with a tapered surface, indicated at 25, which surface, however, in this case, is slotted axially so that when frictionally engaging the corresponding conical surface on the adjacent gear, it will have a wiping action, tending to remove the oil film from such surface. Both the rings 16 and 17 are preferably formed of bronze.

The spacer members 18, as will be apparent from Figures 1, 2, and 3, are provided with extending portions 26 intermediate the lateral edges 19 thereof by which the spacers are riveted to the rings 16 and 17, these projecting portions 26 at each end of the spacer in a circumferential direction, being turned radially inwardly a slight amount to provide lip portions, indicated at 27 in Figure 2. Preferably, these lip portions are also provided with a wedge shaped central slot, as shown at 28 in Figure 1, to cooperate with corresponding wedge shaped end surfaces formed on the circumferentially opposed ends 29 of the arm members 9. The purpose of this construction will be more apparent hereinafter.

Considering now the spring members 12, these members are preferably formed from a flat spring metal stamping and are provided at their central portions with downwardly struck opposed lips 30, which form an intermediate saddle member 32, seating upon the machined surfaces 10 of the clutch hub 5. This locates the spring against lateral movement relative the clutch hub during normal operation. At its extremities, the spring member 12 is provided with upstruck flange portions on opposite sides of its end extremities, indicated at 33 in Figure 4, which flanges form abutments for restraining the spring member against lateral movement relative the two synchronizer rings 16 and 17, to maintain the spring in position laterally. The end extremities of the spring also have tapered portions, indicated at 34, which bear against the inner arcuate surface of the metal spacer members 18 adjacent the extremities thereof, and prevent the spring from moving in a longitudinal direction relative the spacer members or, in other words, from moving circumferentially within the assembly.

Thus, it will be seen that the spring 12 is located to seat normally upon the machined surface 10 intermediate each of the arms 9 of the clutch hub and to be restrained against lateral movement by the end flanges 33 and against lengthwise movement by the bearing of the surfaces 34 against the inner surface of the metal spacers 18.

In the operation of the synchronizer as thus described, when the shift actuating fork or lever is moved from the neutral position in which the mechanism is shown in Figure 4, either in one direction or the other direction, it produces corresponding movement of the ring 15 and the associated clutch hub 5. Because of the saddle portion 32 of the spring 12 seating about the surfaces 10 of the clutch hub, this initial movement is transmitted directly to the adjacent synchronizer ring 16 or 17, these rings being rigidly connected together through the spacers 18, and causes the corresponding tapered surface of the associated synchronizer ring to move into frictional contact with the associated conical surface on the adjacent gear to which the clutch hub is to be engaged.

This frictional drag produces a tendency for the associated gear and the shaft upon which the clutch hub 5 is mounted to assume synchronous speed. During this action, however, the wedge surfaces 29 of the arms 9 are engaged against the corresponding wedge surface 28 of the metal spacers 18, and as a result, there is a tendency to produce a camming action which imparts a circumferential resultant thrust to the synchronizer sleeve assembly and a corresponding circumferential reverse thrust to the clutch hub assembly. As synchronous speed is attained between the associated gear and the clutch hub, further shifting action produces an outward deflection of the center portions of the springs 12 due to the camming action of the surfaces 10 against the cam portions 37 intermediate the saddle 32 and depressed portions 30 of the spring. This forces the spring outwardly and allows the clutch hub 5 to be shifted independently of movement of the synchronizer sleeve assembly comprising the spacers 18 and rings 16 and 17. At the same time, the camming action between surfaces 28 and 29 produces substantially reverse rotation of the clutch hub, allowing the clutch teeth 7, for example, to move into alinement with the corresponding internal clutch teeth on the associated gear and thus allowing the clutch hub 5 to be shifted axially relative to the synchronizer sleeve assembly into positive clutching engagement with the associated gear.

In reversing this action, that is, in declutching from one of the drive gears of a transmission with which such a synchronizer might be used, initial pressure of the shift fork on the collar 15 causes the shift hub 5 to move axially away from the associated gear to which it has been clutched, resulting in disengagement of the associated clutch teeth and freeing the clutch hub 5 from connection to the gear.

As the shift action tends to restore the clutch hub 5 to neutral position, the arm members 9 thereof, move through the space between adjacent ends of spacers 18 and the spring member 12 again is destored to a position where the saddle portion 32 thereof, engages over the machine surface 10 of the clutch hub. This restores the mechanism to the position shown in Figure 4 from whence it can be shifted in either one or the other direction to effect clutching action.

It will be noted that the ring or shift yoke collar 15 is locked to the ends of the arm 9 by the engagement of the wedge shaped lip 13 on these arms within the wedge shaped channel 14 of the ring. In order to assemble the ring to the clutch hub, the ring 15 is first inductively heated to a temperature such that it expands a sufficient amount that the clutch hub 9 may be inserted therein, with the tapered lip moving into alinement with the wedge shaped channel. The outer ring is then quenched to shrink onto the arms of the clutch hub, this quenching action being such as to shrink the ring with sufficient force to provide a tight wedging fit of the ring on the lip 13 and to also produce a chording effect in the ring between the adjacent arms 9 inwardly of a circle circumscribing the outer ends of the arms 9. This chording effect is sufficient to prevent any relative rotation of the ring with respect to the clutch hub, providing a firm locking engagement between these two elements.

It will be apparent that with this construction, a relatively cheap and economical synchronizer sleeve assembly is provided by the use of the metal stampings 18 which engage the two synchronizer rings and are riveted thereto in such manner as to provide a rigid unitary assembly of synchronizer sleeve and synchronizer cones for functioning with the clutch hub and the associated springs.

In certain cases, it has been found that it is unnecessary to provide the recesses 20 in the outer surface of the rings 16 and 17 for embedding the lateral edges 19 of the spacers in the rings, and a construction eliminating this feature is disclosed in Figure 5 in which it will be noted that the spacers 18' are riveted directly onto the outer periphery of the ring 16', in which case, of course, the circumferential thrust between the synchronizer cone and the clutch hub during the clutching action is taken entirely by the shear stress in the rivets.

I am aware that certain changes may be made in the details of the present construction without in any way departing from the underlying principles of the present invention, and I therefore do not intend to be limited except as defined by the scope and spirit of the appended claims.

I claim:

1. A sleeve construction for a synchronizer comprising a pair of annular synchronizer cones having circumferentially directed arcuate recesses in the outer peripheries thereof, a plurality of circumferentially arranged arcuate spacer members having extended lateral edges, rivet means for securing said cones to said lateral edges of said spacer members with the lateral edges of the latter disposed in said recesses to provide an interlock therebetween in a circumferential direction independently of said rivet means, and the ends of the lateral edges of said spacer members lying flush with the outer radial surfaces of said synchronizer cones and the outer arcuate surfaces of said lateral edges of said spacer members lying flush with the extreme outer peripheries of said synchronizer cones.

2. A synchronizer sleeve construction comprising a pair of annular synchronizer cones, a plurality of arcuately shaped spacer members each having a body portion and inwardly extending end extensions intermediate the lateral edges of said body portion, said synchronizer cones having circumferentially extending spaced arcuate recesses in the peripheries thereof for receiving the lateral edges of the body portion of said spacer members to prevent relative circumferential movement of said synchronizer cones and said spacer members, the ends of the lateral edges of the body portion of said spacer members lying flush with the outer radial surfaces of said synchronizer cones and the outer arcuate surfaces of said lateral edges of said spacer members lying flush with the extreme outer peripheries of said synchronizer cones, and the lateral edges of said end extensions of said spacer members being disposed between and in engagement with the inner radial faces of said synchronizer cones to space the latter axially of each other and to take the stress of axial thrust thereon.

ERNEST E. EATON.

REFERENCES CITED

The following references are of record in the file of this patent:

UNITED STATES PATENTS

| Number | Name | Date |
|---|---|---|
| 303,509 | Hamilton | Aug. 12, 1884 |
| 1,423,109 | Hellen | July 18, 1922 |
| 1,886,850 | Tenny | Nov. 8, 1922 |
| 2,256,308 | Bixby et al. | Sept. 16, 1941 |
| 2,391,268 | Peterson et al. | Dec. 18, 1945 |
| 2,409,148 | Peterson et al. | Oct. 8, 1946 |
| 2,425,203 | Peterson | Aug. 5, 1947 |